(12) United States Patent
Stalioraitis et al.

(10) Patent No.: US 11,632,436 B1
(45) Date of Patent: *Apr. 18, 2023

(54) REGULATION METHODS FOR PROXY SERVICES

(71) Applicant: Oxylabs, UAB, Vilnius (LT)

(72) Inventors: Giedrius Stalioraitis, Vilnius (LT); Ovidijus Balkauskas, Vilnius (LT)

(73) Assignee: Oxylabs, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,391

(22) Filed: Sep. 29, 2022

Related U.S. Application Data

(63) Continuation of application No. 17/805,246, filed on Jun. 3, 2022, now Pat. No. 11,496,594, which is a continuation of application No. 17/652,282, filed on Feb. 24, 2022, now Pat. No. 11,381,666, which is a continuation of application No. 17/491,136, filed on Sep. 30, 2021, now Pat. No. 11,297,152.

(51) Int. Cl.
*H04L 67/56* (2022.01)

(52) U.S. Cl.
CPC .................................. *H04L 67/56* (2022.05)

(58) Field of Classification Search
None
See application file for complete search history.

(56) References Cited

U.S. PATENT DOCUMENTS

| | | | |
|---|---|---|---|
| 8,613,089 B1 * | 12/2013 | Holloway | H04L 63/1466 709/227 |
| 8,869,275 B2 | 10/2014 | Zhao et al. | |
| 9,900,357 B2 | 2/2018 | Chen et al. | |
| 10,193,911 B2 | 1/2019 | Zhao et al. | |
| 10,250,618 B2 | 4/2019 | Bhogavilli et al. | |
| 10,581,903 B2 | 3/2020 | Donahue et al. | |
| 10,581,904 B2 | 3/2020 | Holloway et al. | |
| 10,819,636 B1 | 10/2020 | Goel | |
| 10,956,244 B1 | 3/2021 | Cho | |
| 11,032,160 B1 | 6/2021 | Raheja | |
| 2003/0193893 A1 | 10/2003 | Wen et al. | |
| 2006/0059092 A1 * | 3/2006 | Burshan | H04L 67/52 705/51 |
| 2006/0130140 A1 | 6/2006 | Andreev et al. | |

(Continued)

*Primary Examiner* — Quang N Nguyen
(74) *Attorney, Agent, or Firm* — FisherBroyles, LLP; Keats Quinalty

(57) ABSTRACT

Systems and methods to manage and regulate the requests of multiple proxy clients are disclosed. In one aspect, the system and methods disclosed herein aids in configuring proxy server(s) with a rate-limit functionality. Configuration of the rate-limit functionality may be realized by, but not limited to, installing configuration file(s) and/or software application(s) on the proxy server(s). The configuration provides information about the list of restricted and unrestricted domains and their respective request limit specification in a given time frame. Therefore, each time before a proxy server forwards the clients' requests to a target domain, the proxy server checks and ensures that the request count to the particular target domain is well within the limit specified in the request limit specification. Thus, the embodiments described herein aid in preventing the IP addresses of proxy service providers from being blocked or denied from the target websites.

18 Claims, 6 Drawing Sheets

(56) References Cited

U.S. PATENT DOCUMENTS

| | | |
|---|---|---|
| 2014/0372623 A1 | 12/2014 | Chen et al. |
| 2016/0261608 A1* | 9/2016 | Hu .................. H04L 63/1425 |
| 2017/0289053 A1 | 10/2017 | Byelov et al. |
| 2018/0159894 A1 | 6/2018 | Reddy et al. |
| 2019/0007455 A1* | 1/2019 | Sheng ............... H04L 63/1416 |
| 2019/0089740 A1 | 3/2019 | Hastings |
| 2020/0236187 A1 | 7/2020 | Tai et al. |
| 2021/0004297 A1 | 1/2021 | Scrivner et al. |
| 2021/0234890 A1* | 7/2021 | Bansal ................. G06N 5/01 |
| 2021/0377294 A1* | 12/2021 | Gupta ............... H04L 63/1425 |
| 2022/0014395 A1 | 1/2022 | Milescu et al. |
| 2022/0027820 A1 | 1/2022 | Chalam et al. |

\* cited by examiner

REGULATION METHODS FOR PROXY SERVICES

CROSS-REFERENCE TO RELATED APPLICATIONS

The present application is a continuation of U.S. patent application Ser. No. 17/805,246, filed Jun. 3, 2022, which is a continuation of U.S. patent application Ser. No. 17/652,282, filed Feb. 24, 2022, which issued as U.S. Pat. No. 11,381,666 on Jul. 5, 2022, which is a continuation of U.S. patent application Ser. No. 17/491,136, filed Sep. 30, 2021, which issued as U.S. Pat. No. 11,297,152 on Apr. 5, 2022, the contents of each of which are incorporated in their entirety as if repeated herein.

FIELD

The disclosure belongs to the area of proxy technologies, especially for improving proxy services. Methods and systems disclosed herein aim to upgrade proxy servers by enabling them to manage and regulate traffic limits for each proxy client.

BACKGROUND

As our society relies increasingly on the Internet and as many entrepreneurs conduct their businesses online, interest in proxy servers has increased significantly. Modern Proxy servers provide several functionalities to their users apart from online anonymity.

A proxy server is usually a computer system (a combination of hardware platforms and software applications) that serves as an intermediary in network communication between clients and web/resource servers. Proxy servers help prevent potential intruders from invading a private network. When employing proxy servers, specific types of requests (such as for example, HTTP request message) originating from a client are passed through the proxy server, which evaluates the requests and forwards the requests to the appropriate web server. Likewise, responses are sent back to the proxy server, which forwards the response to the requesting client.

Proxy servers change the clients' IP addresses so that the destination web server is not aware of the clients' actual IP addresses. In networking terms, IP address stands for Internet Protocol address, a numerical label assigned to each device connected to a network that uses the Internet Protocol for communication. In a more general sense, an IP address functions as an online address because devices use IPs to locate and communicate with each other. Thus, using a proxy server provides online privacy and access to websites and resources that might not be normally accessed.

Proxy servers are generally divided into different types depending on what functions are provided or what servers are used. The proxies can be divided into residential proxies, datacenter proxies and mobile proxies based on the type of IP addresses. A residential IP proxy is an intermediary proxy server that uses an IP address provided by an Internet Service Provider (ISP). The real owners of the residential IP proxies, namely, Internet service providers (ISPs), register residential IP addresses in public databases, allowing websites to determine a device's internet provider, network, and location. Datacenter IP proxy is the proxy server assigned with a datacenter IP. Datacenter IPs are IPs owned by companies, not by individuals. The datacenter proxies are IP addresses that are not located in a household. Instead, the datacenter proxies are associated with a commercial datacenter. Mobile IP proxies act similar to residential proxies in that they are assigned their IP address by a mobile operator from a pool of IP addresses designated to mobile users. Mobile IP proxies use mobile data, as opposed to a residential proxy that uses broadband ISP connectivity.

Classifications of proxy servers are also done based on protocols on which a particular proxy may operate. For instance, HTTP proxies, SOCKS proxies and FTP proxies are some of the protocol-based proxy categories. The term HTTP stands for Hypertext Transfer Protocol, the foundation for most data exchanges on the Internet. Over the years, HTTP has evolved and extended, making it an inseparable part of the Internet. HTTP allows file transfers over the Internet and, in essence, initiates the communication between a client/user and a server. HTTP remains a crucial aspect of the World Wide Web because HTTP enables the transfer of audio, video, images, and other files over the Internet. HTTP is a widely adopted protocol currently commonly available in three different versions—HTTP/1.1, HTTP/2 and the latest one—HTTP/3.

HTTP proxy can act as a high-performance proxy content filter. Similar to other proxies, HTTP proxy works as an intermediary between the client browser and the destination web server. HTTP proxy can save bandwidth through web traffic compression, caching of files and web pages from the Internet. Here, bandwidth refers to the amount of data that can be transferred from one point to another within a network in a specific amount of time. Typically, bandwidth is expressed as a bitrate and measured in bits per second (bps).

Likewise, SOCKS refers to an Internet protocol that allows one device to send data to another device through a third device. In other words, this device would be called a SOCKS server or a SOCKS proxy. Specifically, a SOCKS proxy creates a connection to any other server that stands behind a firewall, and exchanges network packets between the client and the actual server. SOCKS proxies are often needed where a TCP connection is prohibited, and data can be reached only through UDP. SOCKS proxies are a tool that allows for a specific way to connect to the Internet. SOCKS5 is the latest version of the SOCKS protocol. The difference between SOCKS5 and older versions is improved security and the ability to support UDP traffic.

SOCKS proxies are often used for live calls or streaming. Streaming websites commonly use UDP to send data and currently, SOCKS is the main type of proxies that can handle a UDP session. In order to use a SOCKS proxy, the user's device must have the capability to handle SOCKS protocol and must be able to operate and maintain a SOCKS proxy server. The main problem with SOCKS proxies is that the protocol does not have standard tunnel encryption. Since the SOCKS request carries data in cleartext, SOCKS proxies are not recommended for situations where "sniffing" is likely to occur.

Similar to HTTP and SOCKS, the term FTP refers to one of the protocols used to move files on the Internet. The term FTP stands for File Transfer Protocol. In FTP, a control connection is used to send commands between an FTP client and an FTP server. However, the file transfers occur on a separate connection called the data connection. The FTP proxy can offer enhanced security for uploading files to another server. Moreover, the FTP proxy typically offers a cache function and encryption method, making the transmission process secure and safe from hackers. In addition to relaying traffic in a safe environment, an FTP server keeps track of all FTP traffic.

In computer networking, web servers are a combination of software and hardware that utilizes HTTP and other protocols to respond to client's requests made over the World Wide web. The main responsibility of a web server is to display websites content through storing, processing and delivering web pages to clients. Besides HTTP, web servers may also support SMTP and FTP used for email file transfer and storage. The hardware of a web server is connected to the Internet and allows data to be exchanged with other connected devices, while the web server's software controls how a client accesses the hosted files.

Web server software is accessed through the domain names of the websites and ensures the delivery of the website's data to the requesting client. The software comprises several internal elements, with at least an HTTP server. The hardware of a web server can comprise a computer system that stores web server software and other files related to a website, such as HTML documents, images and JavaScript files.

However, if a web server is not exposed to the public and is used internally, then it is called Intranet Server. When a client requests a website by entering the URL or web address on a web browser's address bar, the browser sends a request to the Internet for viewing the corresponding web page for that address. A Domain Name Server (DNS) converts the Domain to an IP address which in turn points to a web server. Websites on the Internet are identified by their respective IP addresses. For instance, a website on the Internet may have multiple IP addresses as its identifier. An IP address is a unique address that identifies a website on the Internet or a local area network. IP stands for 'Internet Protocol' which is a set of rules that governs the format of communication occurring via the Internet or a local network.

Websites hosted by multiple web servers provide a variety of services on the Internet. To maintain safety, websites implement several security measures. One such measure is setting up a rate limit. In computing, rate limiting is a strategy for limiting network traffic. Rate limit sets up a restriction on how often a client can access the website's data within a certain timeframe. Websites employ rate limiting to prevent certain kinds of malicious bot activity. For example, websites use rate limiting in a way to avoid DDOS attacks, web scraping requests and API overuse. Additionally, websites implement rate limits to avoid overloading on web servers.

Typically, rate limiting is based on tracking the IP addresses from where requests originate and how much time elapses between requests. The IP address is often the main way a web application identifies who or what is making the request to a publicly available website.

Websites enabled with rate limiting feature measure the amount of time between each request from each IP address and also measure the number of requests within a specified timeframe. If there are an exceeding amount of requests from a single IP address within a given timeframe, then the website will not service the subsequent request originating from that particular IP address for a certain amount of time.

Modem proxy servers provide several functionalities to their clients apart from online anonymity. For example, proxy servers can act as a firewall and web filter, provide shared network connections, and cache data to speed up common requests. Proxy servers can provide a high level of privacy. Proxy servers can also be used to control internet usage of employees and children (e.g., organizations and parents set up proxy servers to control and monitor how their employees or kids use the Internet) or improve browsing speeds and save bandwidth (e.g., proxy servers can cache (save a copy of the appropriate website data locally) popular websites and, when a request is made, will send the saved copy to the user).

Furthermore, proxies can be employed to circumvent certain Internet restrictions (e.g. firewalls) by enabling a client to request the content through a (remote) proxy server instead of accessing the content server directly. In simple terms, proxy servers are often used to get around geo-IP based content restrictions. However, in recent times, proxy servers are being used extensively for web scraping, data mining and other related tasks.

Since proxy servers are being used for various purposes, proxy service providers are expected to provide optimal services to their clients. Most importantly, proxy service providers, among other things, are expected to ensure that their IP addresses are not blocked or blacklisted by major web targets on the Internet. This is a constant challenge for proxy service providers to prevent their IP addresses (i.e., proxy servers) from being blocked or denied services from web targets. In most instances, IP addresses of proxy service providers can be blocked or denied service due to exceeding the request rate limit of the target websites. However, if a particular proxy IP address is denied service from a website, the client can lose both time and resources thereby causing dissatisfaction with the proxy service provider. Moreover, dissatisfaction from proxy clients can further lead to significant financial losses for proxy service providers.

Therefore, there is a need for an efficient system for the proxy service providers to regulate the requests originating from their clients according to the target website's rate limit. By doing this, proxy service providers can alleviate the blocking of their IP addresses by target websites. In one aspect, the present embodiments disclosed herein provide at least the following solutions: a) systems and methods to prevent IP addresses (i.e., proxy servers of a proxy service provider) from being blocked or denied services from target websites. b) systems and methods configure a multitude of proxy servers with rate-limiting functionality in order to prevent a client's requests from exceeding the rate limit of target websites. c) systems and methods to regulate requests originating from a plurality of clients according to the rate-limiting functionality configured in each proxy server.

SUMMARY

The summary provided herein presents a general understanding of the exemplary embodiments disclosed in the detailed description accompanied by drawings. Moreover, this summary is not intended, however, as an extensive or exhaustive overview. Instead, the only purpose of this summary is to present the condensed concepts related to the exemplary embodiments in a simplified form as a prelude to the detailed description.

In one aspect, the present embodiments feature systems and methods to optimize the services provided by a proxy service provider. Especially, the embodiments provide systems and methods that enable a multitude of proxy servers to execute rate-limiting functionality such that the proxy servers are not blocked or denied services from target websites. Proxy servers are configured to manage and regulate requests of individual clients according to the configured rate-limiting functionality such that the proxy servers execute client requests successfully.

DETAILED DESCRIPTION

Figure 1:
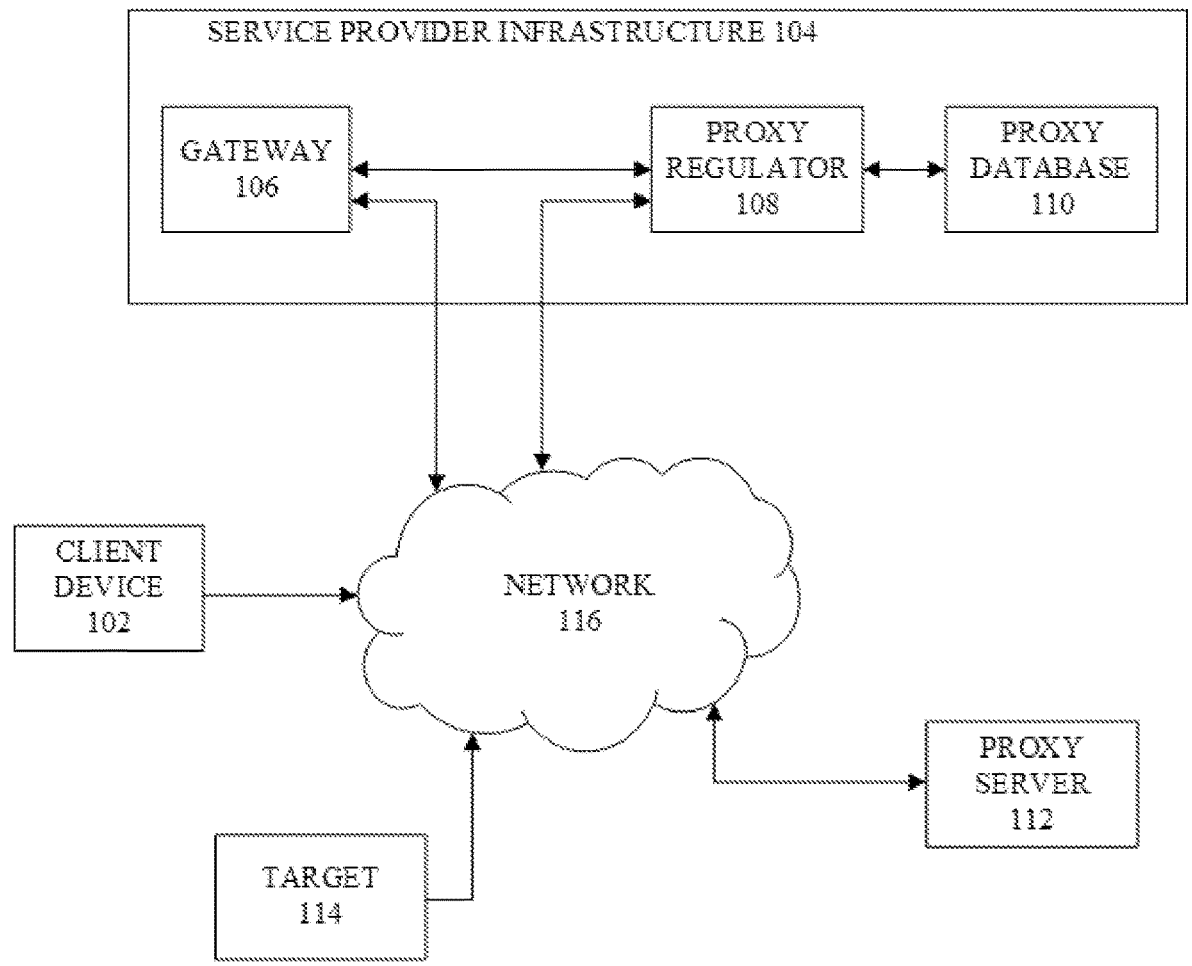
FIG. 1 shows a block diagram of an exemplary architectural depiction of various elements of the embodiments.

Some general terminology descriptions may be helpful and are included herein for convenience and are intended to be interpreted in the broadest possible interpretation. Elements that are not imperatively defined in the description should have the meaning as would be understood by a person skilled in the art. Moreover, the following detailed description provides insight into the embodiments of the claims and should not be taken as limiting the claims with regard to alternative embodiments that are not explicitly described herein.

Client device 102 can be any suitable client computing device including, but not limited to, a smartphone, a tablet computing device, a personal computing device, a laptop computing device, a gaming device, a vehicle infotainment device, an intelligent appliance (e.g., smart refrigerator or smart television), a cloud server, a mainframe, a notebook, a desktop, a workstation, a mobile device, or any other electronic device used for making a scraping request. Additionally, it should be noted that the term "client" is being used in the interest of brevity and may refer to any of a variety of entities that may be associated with a subscriber account such as, for example, a person, an organization, an organizational role within an organization and/or a group within an organization. Furthermore, client device 102 can send requests to service provider infrastructure 104 via network 116. The requests originating from user device 102 can be synchronous or asynchronous and may be sent in different data formats.

Service provider infrastructure (SPI) 104 is the combination of elements comprising the platform that provides proxy services to a plurality of client devices 102. In the present exemplary embodiments, SPI 104 comprises gateway 106, proxy regulator 108 and proxy database 110.

Gateway 106 is an element of the service provider infrastructure 104 and is responsible for providing interoperability between the elements of the SPI 104 and a plurality of client devices 102. In computer networking, the term interoperability denotes the continuous ability to send and receive data among the interconnected elements in a system. In the present embodiments, Gateway 106 can receive and forward multiple requests from the client device 102 to proxy regulator 108, respectively. Further, gateway 106 receives and forwards the proxy information from proxy regulator 108 to client device 102.

Proxy regulator 108 is an element of the SPI 104 and is responsible for configuring proxy server 112 with rate-limiting functionality. The proxy server 112 configured with rate-limiting functionality can manage and regulate the requests from the client device 102. Additionally, proxy regulator 108 is responsible for configuring the proxy server 112 with the authentication credentials and authorization information of client device 102. Furthermore, proxy regulator 108 is responsible for storing the proxy information to the proxy database 110. Proxy regulator 108 is responsible for receiving the request for a proxy server from the client device 102 and providing the proxy information to the client device 102. Proxy regulator 108 can configure rate-limiting functionality on a multitude of proxy servers irrespective of their locations. Proxy regulator 108 may be a singular element or may comprise multiple sub-elements. Moreover, proxy regulator 108 may be an automated application or a regular application within the service provider infrastructure 104. However, such an arrangement of the proxy regulator 108 will not affect its functionality in relation to the embodiments disclosed herein.

Proxy database 110 is also an element of service provider infrastructure 104 and is responsible for storing proxy information such as, for example, proxy IP addresses, proxy location, proxy Autonomous System Number (ASN) and proxy type. Proxy database 110 receives the proxy information from proxy regulator 108. Proxy database 110, in one aspect, serves as a storage unit within the SPI 104 comprising aggregations of data or information on multiple proxy servers arranged in an orderly manner. In the current embodiment, proxy database 110 is shown as an element of the service provider infrastructure 104. However, in some embodiments, proxy databases can be external to the SPI 104.

Proxy server 112 is an exemplary proxy server (i.e., a collection of computing systems and/or applications) that acts as an intermediary between the client device 102 and a target website/domain (here, represented by the target 114). Client device 102 connects and sends requests to the proxy server 112 seeking data or services (such as, for example, a file, a web page, or other resources) from a target website. In some embodiments, client device 102 can send requests to the proxy server 112 in order to send data or services to a target website. The proxy server 112 can receive and forward multiple requests from the client device 102 to the target 114. Similarly, the proxy server 112 can receive and forward the response data from target 114 to the client device 102. Proxy server 112 is identified on network 116 by a unique individual IP address and/or a set of multiple unique IP addresses.

Target 114 is an exemplary instance of a server serving media contents, resources, information or services over the network 116. Target 114 can be identified and accessed by, for example, a particular IP address, a domain name, and/or hostname, possibly with a defined network protocol port that represents a resource address or a remote system serving the content accessible through industry-standard protocols. Target 114 may be a physical or a cloud server.

Network 116 is a digital telecommunication network that allows several elements of the current embodiments to share and access resources. Examples of a network: local-area networks (LANs), wide-area networks (WANs), campus-area networks (CANs), metropolitan-area networks (MANs), home-area networks (HANs), Intranet, Extranet, Internetwork, Internet.

In one aspect, the embodiments described herein provide systems and methods to configure a rate-limiting functionality on a multitude of proxy servers (i.e., on multiple instances of the proxy server 112). Configuration of the rate-limiting functionality may be realized by, but not limited to, installing configuration file(s) and/or software application(s) on proxy server 112. The configured proxy server 112, i.e., the proxy server 112 after configuration of the rate-limiting functionality, can manage and regulate the incoming and outgoing requests. Here, the term incoming requests refer to the requests received by the proxy server 112 from the client device 102. Similarly, the term outgoing requests refer to the requests (requests received from the client device 102) forwarded by the proxy server 112 to the target 114.

FIG. 1 shows a block diagram of an exemplary architectural depiction of various elements of the embodiments. FIG. 1 comprises a client device 102, a service provider infrastructure 104, a proxy server 112 and target 114. In FIG. 1, all the elements mentioned above have access to network 116 (e.g., Internet). The service provider infrastructure 104 comprises gateway 106, proxy regulator 108 and proxy database 110.

While the elements shown in FIG. 1 implement the exemplary embodiment, some elements in other implementations can have different titles or be combined into a single element instead of two separate elements (for example, proxy regulator 108 and proxy database 110 can be co-located as a single element). However, the functionality of the elements and the flow of information between the elements is not impacted by such combinations or consolidations. Therefore, FIG. 1, as shown, should be interpreted as exemplary only and not restrictive or exclusionary of other features, including features discussed in other areas of this disclosure.

Within the service provider infrastructure, gateway 106 and proxy regulator 108 can communicate with outside elements. Specifically, gateway 106 can communicate with the client device 102 via network 116 and proxy regulator 108 can communicate with proxy server 112 via network 116. Moreover, gateway 106, proxy regulator 108 and proxy database 110 are communicably connected to each other internally within the service provider infrastructure 104. However, in some embodiments, gateway 106, proxy regulator 108 and proxy database 110 are communicably connected to each other through an internal or an external network within the service provider infrastructure 104.

Furthermore, in FIG. 1, network 116, as described before, can be local-area networks (LANs), wide-area networks (WANs), campus-area networks (CANs), metropolitan-area networks (MANs), home-area networks (HANs), Intranet, Extranet, Internetwork, Internet. However, the Internet is the most relevant network for the functioning of the present embodiment. Connection to network 116 may require that the client device 102, service provider infrastructure 104, proxy 112, and target 114 execute software routines that enable, for example, the seven layers of the OSI model of the telecommunication network or an equivalent in a wireless telecommunication network.

Referring to FIG. 1, in one aspect, proxy regulator 108, present with the service provider infrastructure 104 accesses proxy server 112 via network 116 and establishes a network communication channel. Proxy regulator 108, after establishing the connection with proxy server 112, among other things, may evaluate the condition of the proxy server 112. Evaluation of the proxy server 112 may be carried out by proxy regulator 108 by performing a series of tests on proxy server 112. Some exemplary testing methods may include but are not limited to ping tests and benchmark tests. These testing methods will ensure the active status of the proxy server 112 and its ability to forward requests to target domains over the network 116.

Following the evaluation of proxy server 112, proxy regulator 108 proceeds to configure rate-limiting functionality on proxy server 112. Configuration of the rate-limit functionality may be realized by, but not limited to, installing configuration file(s) and/or software application(s) on the proxy server 112. The configuration file(s) and/or the software application(s) installed on the proxy server 112, may provide information regarding the following, but not limited to:

- The list of restricted target domains. The term 'restricted target domain(s)', as used herein, refers to the list of target domains and their related sub-domains to which the rate-limiting functionality is applicable.
- The list of unrestricted target domains. The term 'unrestricted target domain(s)', as used herein refers to the list of target domains and their related sub-domains to which the rate-limiting functionality is not applicable.
- Request limit specifications of each restricted target domain for the unique individual IP address belonging to the proxy server 112.
- Request limit specifications of each restricted target domain for the set of multiple unique IP addresses belonging to the proxy server 112.

Here, the term 'request limit specifications' or simply 'request limit' as used herein, signifies the permissible number of requests that can be submitted and/or forwarded from an IP address to a restricted target domain and/or its related subdomain within a specific time frame.

For example, a request limit specification of a restricted target domain may specify the request limit as twenty requests in 3600 seconds for the individual unique IP address of the proxy server 112. Likewise, the request limit specification of a restricted target domain may specify the request limit as eighty requests in 900 seconds for each unique IP address present in the set of multiple unique IP addresses of the proxy server 112.

Further, the configuration file(s) and/or the software application(s) installed on proxy server 112 can enable proxy server 112 to manage and regulate the incoming requests (i.e., the requests received from the client device 102) and the outgoing requests (i.e., the requests of the client device 102 forwarded by the proxy server 112 to a target domain). Through managing and regulating, proxy server 112 can ensure that the outgoing request does not exceed the limit specified by the request limit specifications.

For illustrative purposes, FIG. 1 shows proxy regulator 108 configuring a single instance of the proxy server 112. But in actuality, proxy regulator 108 can configure a multitude of proxy servers (i.e., multiple instances of proxy server 112). Moreover, proxy server 112 can execute the rate-limiting functionality immediately after being configured by proxy regulator 108.

In addition to configuring the rate-limiting functionality on the proxy server 112, proxy regulator 108 also configures the authentication credentials and authorization details of the client device 102 (not shown) on the proxy server 112. Accordingly, proxy server 112 stores the configured authentication credentials and authorization details of the client device 102 within its internal storage. However, proxy regulator 108 can configure the authentication credentials and authorization details of multiple client devices 102 on proxy server 112.

After configuring the rate-limiting functionality on proxy server 112, proxy regulator 108 stores the information regarding proxy server 112 in the proxy database 110. Some of the exemplary information stored by the proxy regulator in the proxy database 110 can include the IP address of proxy server 112, geo-location details of the proxy server 112 and ASN of the proxy server 112. Proxy regulator 108 stores information regarding multiple instances of proxy servers 112.

Referring to FIG. 1, in another exemplary aspect, client device 102 initiates and establishes a network communication channel with service provider infrastructure 104, especially with gateway 106 via network 116 in coherence with standard network communication protocols such as but not limited to HTTP. In computing, network protocol refers to a system of rules that enables two or more entities in a network to exchange information. Network communication protocols define rules, syntaxes, semantics, and possible error recovery methods for communication between network entities.

Upon establishing the network communication channel, client device 102 submits a request to gateway 106, seeking proxy server(s) information. Here, information of proxy server(s), among other things, can comprise IP addresses, geo-location details of the proxy server(s), etc. The request seeking proxy server(s) information, submitted by the client device 102, may be coupled with, but not limited to, authentication credentials. For example, authentication credentials can include but are not limited to usernames/IDs, passwords, PINs, serial numbers, one time passwords (OTPs), or other credentials available with client device 102. The request submitted by client device 102 also may comprise the client's proxy preferences.

Gateway 106, having received the request from client device 102, forwards the request to proxy regulator 108. After receiving the request from gateway 106, proxy regulator 108 finds and fetches proxy server(s) information from the proxy database 110 and relays it to the client device 102 through gateway 106.

After receiving the proxy server(s) information sent by proxy regulator 108 via gateway 106, the client device 102 initiates and establishes a network communication channel with the particular proxy server (represented by proxy server 112) by utilizing the information received from proxy regulator 108 and submits a request. In the current exemplary embodiment, client device 102 submits a request seeking data and/or services from target 114. However, in some embodiments, client device 102 can submit a request in order to send data or provide services to target 114.

Here, the request submitted by the client device 102 for seeking data and/or services from target 114 may comprise, among other things, the URL of target 114 and relevant queries. In the most general sense, the term 'URL' (Uniform Resource Locator) refers to a web resource that specifies the location of the web resource on a computer network and a mechanism for retrieving data from the particular web resource. Additionally, the request submitted by the client device 102 for seeking data and/or services from target 114 may also comprise authentication credentials. Here, the authentication credentials can include but are not limited to usernames/IDs, passwords, PINs, serial numbers, OTPs or other credentials available with client device 102.

Proxy server 112 receives the request from client device 102 and initially proceeds to authenticate the client device 102. Proxy server 12 checks the credentials received from client device 102 against the credentials configured by proxy regulator 108. Once the authentication is successful, proxy server 112 proceeds to check whether the client device 102 is authorized to access or use the services offered by proxy server 112.

However, if the authentication process fails, i.e., if the credentials received from the client device 102 do not match the credentials configured by proxy regulator 108, proxy server 112 sends an error message to the client device 102, thereby prohibiting the client device 102 from further access. Likewise, in some instances, authentication of the client device 102 may be successful; however, the particular client device 102 may not be authorized to access or use proxy server 112. In that case, proxy server 112 sends an error message to client device 102, thereby prohibiting client device 102 from accessing or using the services offered by proxy server 112.

After authentication and authorization, proxy server 112 prepares to forward the request received from the client device 102 to target 114. However, before forwarding the request to target 114, proxy server 112 checks the target domain (represented by target 114) mentioned in the request (originated from the client device 102) against the list of restricted domains and the list of unrestricted domains.

Suppose the target domain (represented by target 114) is mentioned in the list of unrestricted domains, in that case, the proxy server 112 forwards the request (originated from client device 102) to target 114. Subsequently, target 114 responds to the request by sending the necessary response data to proxy server 112. Afterwhich, proxy server 112 forwards the response data to client device 102.

However, suppose instead that the target domain (represented by target 112) is mentioned in the list of restricted target domains; in that case, the proxy server 112 checks whether the request count for the particular target domain has reached the limit in a given time frame specified by the request limit specification. Accordingly, if the request count for the particular target domain is within the request limit specification, the proxy server 112 forwards the request (originated from the client device 102) to the target 114. The term 'request count' as used herein refers to the number of requests that have been submitted or forwarded so far by an IP address (belonging to the proxy server 112) to the particular target domain in a specific time frame.

As a response to the request, target 114 sends the necessary response data to proxy server 112. After receiving the response data from target 114, proxy server 112 forwards the response data to the client device 102. In contrast, if the request count for the particular target domain has exceeded the request limit specification, proxy server 112 restrains from forwarding the request (originated from the client device 102) to the target 114. Further, the proxy server 112 sends an error message to the client device 102. The error message sent by the proxy server 112 to the client device 102 may comprise a status code (for example, HTTP 429 status code) indicating that the client device 102 has exceeded the request limit within a specific time frame. Additionally, the error message can also comprise information about the waiting time before submitting a new request.

Therefore, through the methods and systems mentioned above, the current embodiments can prevent the IP addresses of a proxy server from being blocked or denied services from target websites. Moreover, one could understand that through the methods and systems mentioned above, the current embodiments can manage and regulate requests originating from a plurality of clients according to a configured rate-limit feature.

Figure 2:
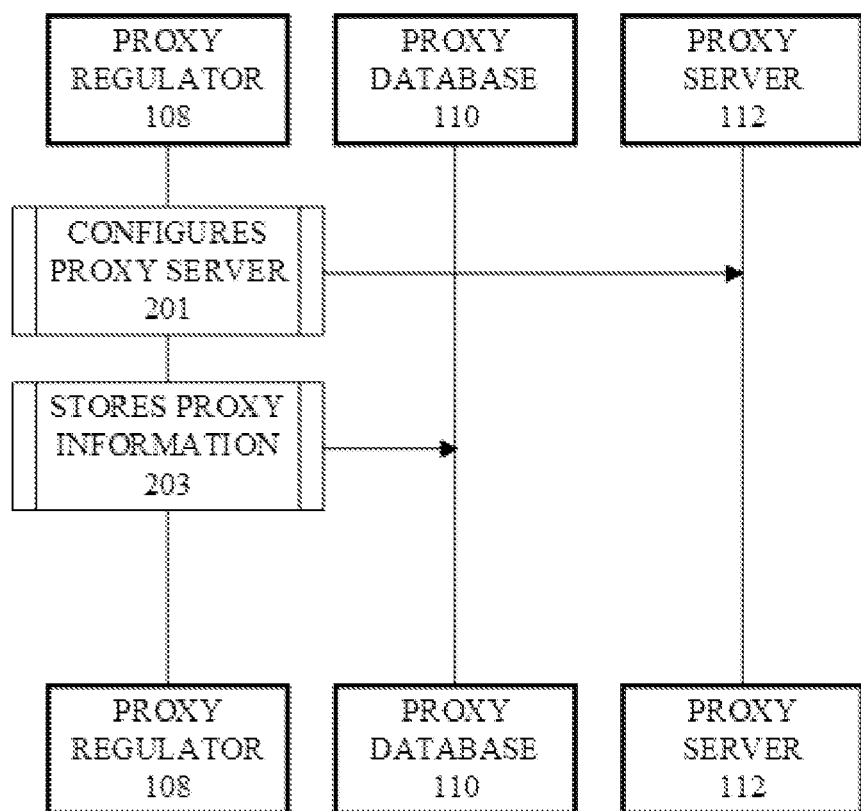
FIG. 2 is an exemplary sequence diagram showing the steps involved in configuring the proxy server with rate-limiting functionality.

FIG. 2 is an exemplary sequence diagram showing the steps involved in configuring the proxy server with rate-limiting functionality. In step 201, proxy regulator 108, present within the service provider infrastructure 104, accesses proxy server 112 via network 116 and configures the proxy server 112 with the rate-limiting functionality. However, prior to accessing and configuring the proxy server 112 with the rate-limiting functionality, proxy regulator 108 may have to initiate the connection with proxy server 112. Similarly, before accessing and configuring the proxy server 112, proxy regulator 108 may evaluate the condition of the proxy server 112.

Specifically, in step 201, proxy regulator 108 configures the proxy server 112 with the rate-limiting functionality by, but not limited to, installing configuration file(s) and/or software application(s) on proxy server 112. The configured proxy server 112, i.e., the proxy server 112 after configuration of the rate-limiting functionality, can manage and regulate the incoming and outgoing requests. Here, the term incoming requests refer to the requests received by the proxy server 112 from the client device 102. Similarly, the term outgoing requests refer to the requests (i.e., requests received from the client device 102) forwarded by the proxy server 112 to the target 114. By managing and regulating, proxy server 112 can ensure that the outgoing request does not exceed the limit specified by the request limit specification.

Moreover as previously mentioned, the configuration file(s) and/or the software application(s) installed on the proxy server 112 may provide information regarding the following, but not limited to:

The list of restricted domains. The term 'restricted target domain(s)', as used herein, refers to the list of target domains and their related sub-domains to which the rate-limiting functionality is applicable.

The list of unrestricted domains. The term 'unrestricted target domains', as used herein refers to the list of target domains and their related sub-domains to which the rate-limiting functionality is not applicable.

Request limit specifications of each restricted target domain for the unique individual IP address belonging to the proxy server 112.

Request limit specifications of each restricted target domain for the set of multiple unique IP addresses belonging to the proxy server 112.

Here, the term 'request limit specifications' or simply 'request limit' as used herein, signifies the permissible number of requests that can be submitted an/or forwarded from an IP address to a restricted target domain and/or its related subdomain within a specific time frame.

For example, a request limit specification of a restricted target domain may specify the request limit as twenty requests in 3600 seconds for the individual unique IP address of the proxy server 112. Likewise, the request limit specification of a restricted target domain may specify the request limit as eighty requests in 900 seconds for each unique IP address present in the set of multiple unique IP addresses of the proxy server 112.

After configuring the proxy server 112, in step 203, proxy regulator 108 stores the information on proxy server 112 in the proxy database 110. Specifically, proxy regulator 108 sends information such as, for example, the IP address of proxy server 112, geo-location details of the proxy server 112 and ASN of the proxy server 112 to proxy database 110. Accordingly, the proxy database 110 receives and stores the information on proxy server 112 within its internal storage.

Alongside the configuration of the rate-limiting feature on proxy server 112, the proxy regulator 108 also configures the authentication credentials and authorization details of the client device 102 (not shown here). Accordingly, proxy server 112 stores the authentication credentials and authorization details within its internal storage.

Figure 3A:
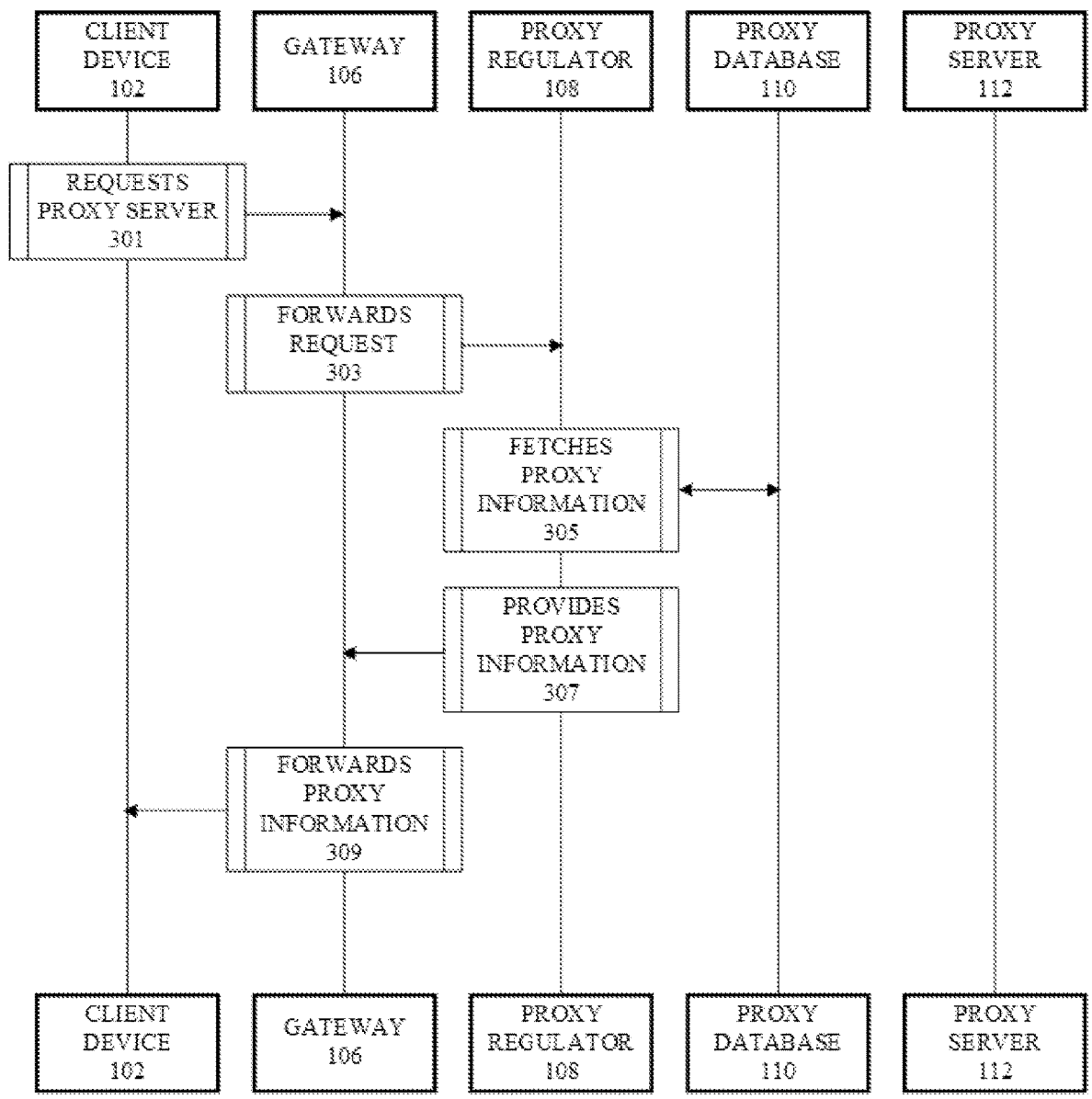
FIG. 3A is an exemplary sequence diagram showing the implementation of rate-limiting functionality in proxy services.

FIG. 3A is an exemplary sequence diagram showing the implementation of rate-limiting functionality in proxy services. In step 301, client device 102 submits a request to gateway 106, seeking information of a proxy server (represented by proxy server 112). The request, among other things, may comprise the client's proxy preferences. Furthermore, the information of proxy server 112 can include, but are not limited to, the IP address of proxy server 112, and/or geo-location details of the proxy server 112.

Moreover, the request submitted by client device 102 to gateway 106, seeking information of a proxy server (represented by proxy server 112) may be coupled with but not limited to the authentication credentials. Exemplary authentication credentials include usernames/IDs, passwords, PINs, serial numbers, OTPs, or other credentials available with client device 102.

After receiving the request from client device 102, in step 303, gateway 106 forwards the request to proxy regulator 108. Proxy regulator 108, having received the request, proceeds to find the requested information of a proxy server 112 (represented by the proxy server 112) by accessing the proxy database 110. Accordingly, in step 305, proxy regulator 108 fetches the proxy server's 112 information from proxy database 110. The information of proxy server 112 being fetched by proxy regulator 108 from proxy database 110 can comprise but not limited to IP address, geo-location, ASN (Autonomous System Number).

FIG. 3A is only an exemplary sequence diagram that shows the client device 102 seeking information on a proxy server. However, the client device 102 may seek information on multiple proxy servers. FIG. 3A shows proxy regulator finding, fetching and sending the information on a single proxy server. However, proxy regulator 108 can find, fetch and send information on multiple proxy servers.

In step 307, proxy regulator 108 sends the information of proxy server 112 to gateway 106. Consecutively, in step 309, gateway 106 receives the information of proxy server 112 and forwards the information to the client device 102.

Figure 3B:
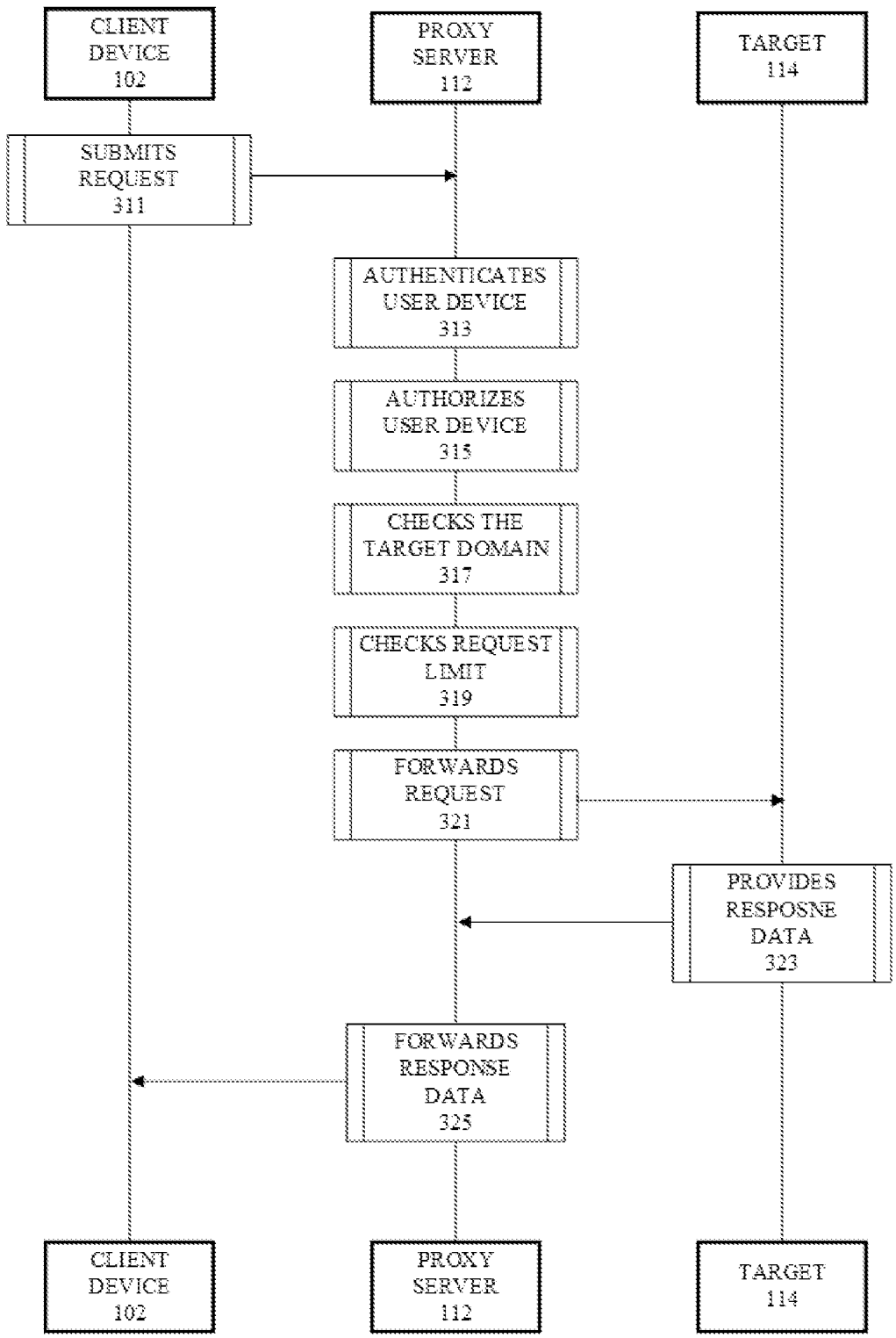
FIG. 3B is the continuation of an exemplary sequence diagram showing the implementation of rate-limiting functionality in proxy services.

FIG. 3B is the continuation of an exemplary sequential diagram showing the implementation of rate-limit functionality in proxy services. In step 311, client device 102 submits a request seeking data and/or services from target 114. Here, the request submitted by the client device 102 may comprise, but not be limited to, the URL of the target 114 and relevant queries. Additionally, the request submitted by the client device 102 for seeking data and/or services from the target 114 can also comprise, but not be limited to, the authentication credentials. Some of the exemplary authentication credentials can include usernames/IDs, passwords, PINs, serial numbers, OTPs, or other credentials available with client device 102.

In step 313 and 315, proxy server 112 proceeds to authenticate and checks the authorization details of the client device 102. Specifically, proxy server 112 checks the authentication credentials received from the client device 102 against the credentials configured by the proxy regulator 108. Once the authentication is successful, the proxy server 112 proceeds to check whether the client device 102 is authorized to access or use the services offered by proxy server 112.

However, if the authentication process fails, i.e., if the credentials received from client device 102 do not match the credentials received from proxy regulator 108, proxy server 112 sends an error message to client device 102 (not shown), thereby prohibiting the client device 102 from further access. Likewise, in some instances, authentication of the client device 102 may be successful, however, the particular client device 102 may not be authorized to access or use proxy server 112. In that case, proxy server 112 sends an error message to client device 102 (not shown), thereby prohibiting the client device 102 from using the services offered by proxy server 112.

After successful authentication and authorization, in step 317, proxy server 112 checks the target domain (represented by target 114) against the list of restricted domains and the list of unrestricted domains. FIG. 3B is an exemplary sequential diagram of the current embodiment in which target 112 is mentioned in the list of restricted domains. In step 319, proxy server 112 checks whether the request count for the target 114 has reached the limit in a given time frame specified by the request limit specification. The term 'request count' as used herein refers to the number of requests that have been submitted or forwarded so far by an IP address (belonging to the proxy server 112) to the particular target domain in a specific time frame.

For example, a request limit specification of a restricted target domain may specify the request limit as twenty requests in 3600 seconds for the individual unique IP address of the proxy server 112. Likewise, in another exemplary embodiment, the request limit specification of a restricted target domain may specify the request limit as eighty requests in 900 seconds for each unique IP address present in the set of multiple unique IP addresses of the proxy server 112.

Accordingly, if the request count for target 114 is not exceeded in a specific time frame, in step 321, proxy server 112 forwards the original request received from the client device 102 to the target 114. Subsequently, target 114 receives the request from the proxy server 112 and as a response, sends the necessary data as the response data as shown in step 323, where target 114 provides the response data to the proxy server 112. In step 325, proxy server 112 receives the response data and forwards the response data to the client device 102.

Figure 3C:
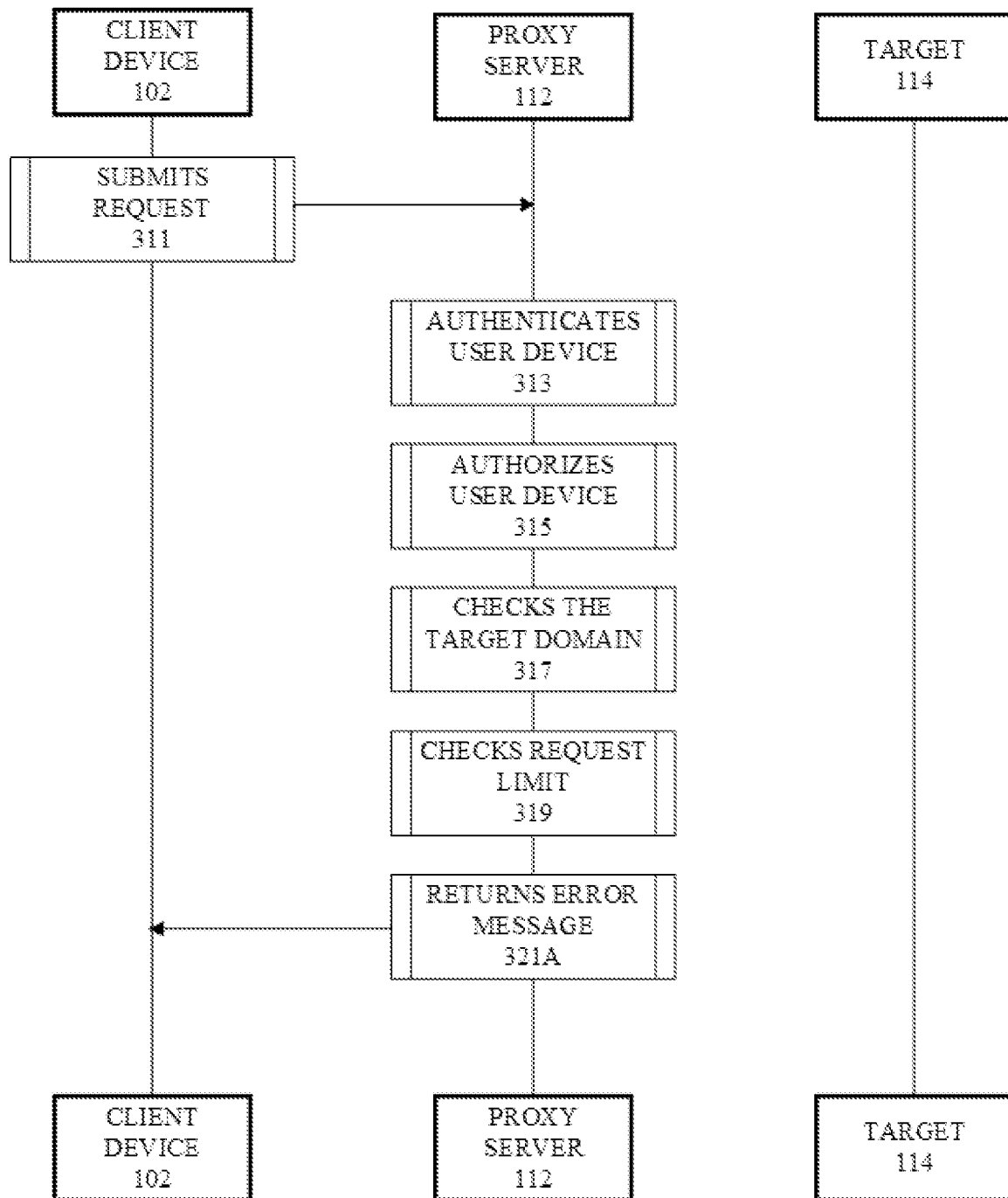
FIG. 3C is the continuation of an exemplary sequence diagram and alternative to FIG. 3B, showing the implementation of rate-limiting functionality in proxy services.

FIG. 3C is the continuation of an exemplary sequential diagram and alternative to FIG. 3B, showing the implementation of the rate-limit feature in proxy services. In FIG. 3C steps 311-319 are the same as described in FIG. 3B. However, in FIG. 3C, the request count for target 114 has exceeded the limit in a given time frame specified by the request limit specification. In that case, proxy server 112 restrains from forwarding the original request received from the client device 102 to the target 114. Therefore, in step 321A, proxy server 112 sends an error message to the client device 102. The error message sent by proxy server 112 to client device 102 may comprise a status code indicating that the client device 102 has exceeded the request limit within a specific time frame. Additionally, the error message can also comprise information about the waiting time before submitting a new request.

Therefore, through the methods and systems mentioned above, the current embodiments can prevent the IP addresses of a proxy server from being blocked or denied services from target websites. Moreover, through the methods and systems mentioned above, the current embodiments can manage and regulate requests originating from a plurality of clients according to a configured rate-limit feature.

Figure 4:
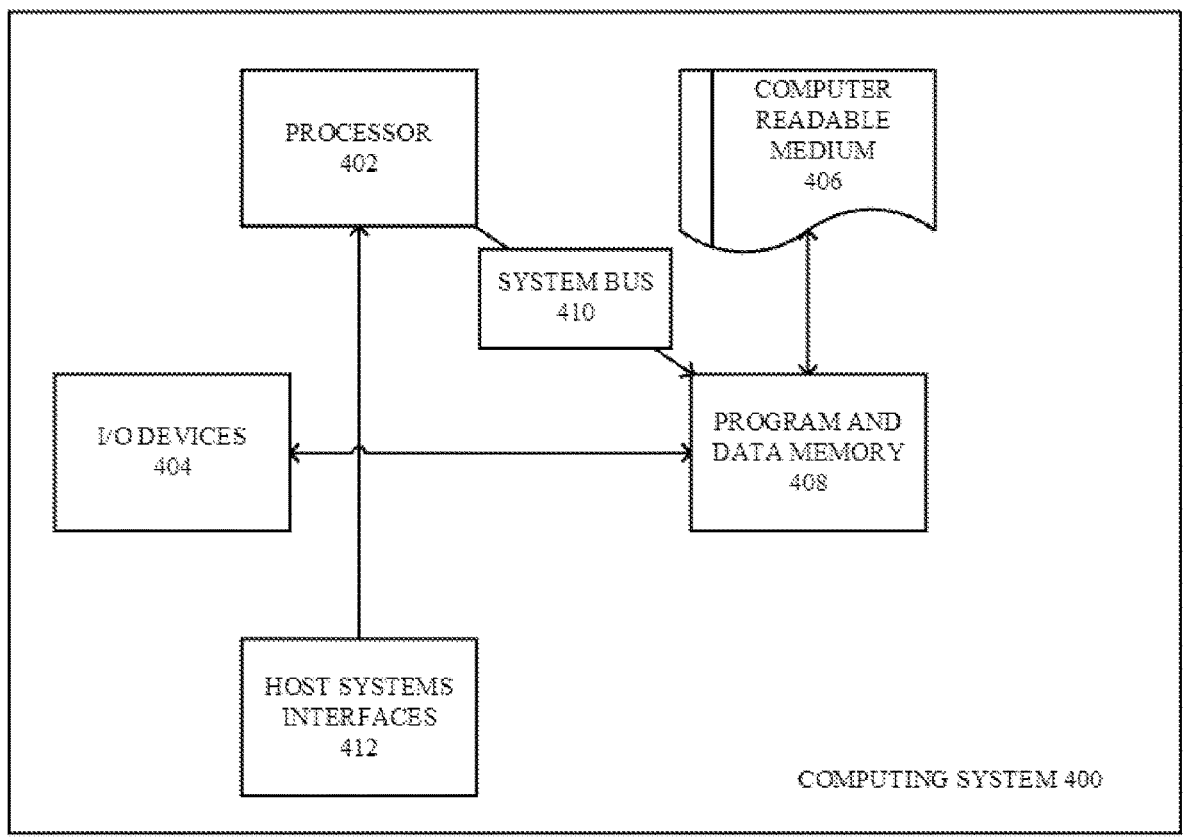
FIG. 4 shows a block diagram of an exemplary computing system.

The embodiments herein may be combined or collocated in a variety of alternative ways due to design choice. Accordingly, the features and aspects herein are not in any way intended to be limited to any particular embodiment. Furthermore, one must be aware that the embodiments can take the form of hardware, firmware, software, and/or combinations thereof. In one embodiment, such software includes but is not limited to firmware, resident software, microcode, etc. FIG. 4 illustrates a computing system 400 in which a computer readable medium 406 may provide instruction for performing any methods and processes disclosed herein.

Furthermore, some aspects of the embodiments herein can take the form of a computer program product accessible from the computer readable medium 406 to provide program code for use by or in connection with a computer or any instruction execution system. For the purposes of this description, the computer readable medium 406 can be any apparatus that can tangibly store the program code for use by or in connection with the instruction execution system, apparatus, or device, including the computing system 400.

The computer readable medium 406 can be any tangible electronic, magnetic, optical, electromagnetic, infrared, or semiconductor system (or apparatus or device). Some examples of a computer readable medium 406 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 400 can include one or more processors 402 coupled directly or indirectly to memory 408 through a system bus 410. The memory 408 can include local memory employed during actual execution of the program code, bulk storage, and/or cache memories, which provide temporary storage of at least some of the program code in order to reduce the number of times the code is retrieved from bulk storage during execution.

Input/output (I/O) devices 404 (including but not limited to keyboards, displays, pointing devices, I/O interfaces, etc.) can be coupled to the computing system 400 either directly or through intervening I/O controllers. In some instances, storage devices are considered as Input/output (I/O) devices 404. In that case, computer readable medium 406 is a subset of Input/output (I/O) devices 404.

Network adapters may also be coupled to the computing system 400 to enable the computing system 400 to couple to other data processing systems, such as through host systems interfaces 412, printers, and/or storage devices through intervening private or public networks. Modems, cable modems, and Ethernet cards are just examples of network adapter types.

The disclosure discloses a method to regulate proxy servers by establishing a rate-limiting functionality on a multitude of proxy servers comprising: installing, by a proxy regulator, a configuration file with a rate-limiting functionality on a proxy server; storing, by the proxy regulator, configuration setting and metadata information about the proxy server in a proxy database; receiving, by the gateway, a request about the proxy server from a client device; forwarding, by the gateway, the request to the proxy regulator; finding, by the proxy regulator, proxy server information from the proxy database; sending, by the proxy regulator, the proxy server information to the client device through the gateway; upon receiving the client request, checking, by the proxy server, a target domain indicated in the client request according to settings of rate-limiting functionality whether the target domain is in a list of restricted domains or unrestricted domains.

In the method disclosed, upon performing a check if the target domain is in the list of restricted domains or unrestricted domains the proxy server performs the following actions: when the target domain is in the list of unrestricted domains, sending the client request to the target; when the target domain is in the list of restricted domains, checking whether a request count for restricted domain has reached a limit in a given time frame and if the request count for a particular target domain is below the limit, the proxy server forwards the request to the target; if the request count for the particular target domain has exceeded the limit, the proxy server sends an error message to the client device.

The method also discloses that the configuration file or software application of the rate-limiting functionality includes any one of the following or a combination thereof: the list of restricted target domains and related sub-domains to which the rate-limiting functionality is applicable; the list of unrestricted domains and related sub-domains to which the rate-limiting functionality is not applicable; request limit specifications of each restricted target domain for an unique IP address belonging to the proxy server; request limit specifications of each restricted target domain for a set of multiple unique IP addresses belonging to the proxy server.

In the method disclosed, the exceeding the limit, or the limit itself, indicates a number of requests that a proxy server's singular IP address or a set of unique IP addresses can submit or forward to each of the restricted target domains in a specific time frame. In the disclosure indicated configuration file installed on the proxy server, enables the proxy server to manage and regulate the incoming requests and the outgoing requests.

In the disclosure, request for the proxy server comprises at least one of the following or combination thereof: proxy IP addresses, IP geo-location details, or proxy TCP/IP port address. The request from the client device can be coupled with authentication credentials, such as usernames/IDs, passwords, PINs, serial numbers, or one time passwords (OTPs).

The disclosure also presents a system to regulate proxy servers by establishing a rate-limiting functionality on a multitude of proxy servers comprising: 1) A proxy regulator, operable to install a configuration file with a rate-limiting functionality on a proxy server, to store configuration setting and metadata information about the proxy server in a proxy database, to find proxy server information from the proxy database. 2) A gateway, operable to communicate with a client, to receive a request about the proxy server from a client device, to forward the client request to the proxy regulator. 3) The proxy server with installed a configuration file, operable to check a target domain indicated in the request according to rate-limiting functionality settings whether the target domain is in a list of restricted domains or unrestricted domains.

The system is disclosed, wherein upon performing a check if the target domain is in the list of restricted domains or unrestricted domains, the proxy server performs the following actions: when the target domain is in the list of unrestricted domains, sending the client request to the target; when the target domain is in the list of restricted domains checking whether a request count for restricted domain has reached a limit in a given time frame and if the request count for a particular target domain is below the limit, the proxy server forwards the request to the target; if the request count for the particular target domain has exceeded the limit, the proxy server sends an error message to the client device.

The system is disclosed where the configuration file or software application of the rate-limiting functionality includes any one of the following or a combination thereof: the list of restricted target domains and related sub-domains to which the rate-limiting functionality is applicable; the list of unrestricted domains and related sub-domains to which the rate-limiting functionality is not applicable; request limit specifications of each restricted target domain for an unique individual IP address belonging to the proxy server; request limit specifications of each restricted target domain for a set of multiple unique IP addresses belonging to the proxy server.

The system wherein the limit indicates a number of requests that a proxy server's singular IP address or a set of unique IP addresses can submit or forward to each of the restricted target domains in a specific time frame. The system wherein the configuration file installed on the proxy server enables the proxy server to manage and regulate the incoming requests and the outgoing requests and wherein the request for the proxy server comprises at least one of the following or combination thereof: proxy IP addresses, IP geo-location details, or proxy TCP/IP port address.

The system disclosed, wherein the request from the client device can be coupled with authentication credentials, such as usernames/IDs, passwords, PINs, serial numbers, or OTPs.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The inventions are defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way but may also be configured in ways that are not listed. For the indication of elements, a singular or plural form can be used, but it does not limit the scope of the disclosure and the same teaching can apply to multiple objects, even if in the current application an object is referred to in its singular form.

The disclosure is provided to allow the reader to quickly ascertain the nature of the technical disclosure. It is submitted with the understanding that it will not be used to interpret or limit the scope or meaning of the claims. In addition, in the foregoing detailed description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

What is claimed:

1. A system to regulate and upgrade proxy servers comprising:
   a proxy regulator, operable to install a configuration file on a proxy server, to store configuration setting and metadata information about the proxy server in a proxy database, and to select proxy server information from the proxy database;
   a gateway, operable to communicate with a client, to receive a proxy server request from a client device about the proxy server, and to forward the proxy server request to the proxy regulator;
   the proxy regulator, operable to send proxy server information from the proxy database to the client device through the gateway; and
   the proxy server with the installed configuration file, upon receiving a client request from the client device, operable to check a target domain indicated in the client request to determine whether the target domain is in a list of restricted domains or a list of unrestricted domains;
   if the target domain is in the list of unrestricted domains, sending the client request to the target domain;
   if the target domain is in the list of restricted domains, checking whether a request count for the target domain has reached a limit in a time frame; and:
     if the request count for the target domain is below the limit, the proxy server forwards the client request to the target domain;
     if the request count for the target domain is over the limit, the proxy server sends an error message to the client device;
   wherein the configuration file enables the proxy server to manage incoming requests and outgoing requests.

2. The system of claim 1, wherein the configuration file includes one, or a combination, of:
   the list of restricted domains and related sub-domains to which a rate-limiting functionality is applicable;
   the list of unrestricted domains and related sub-domains to which the rate-limiting functionality is not applicable;
   request limit specifications of each restricted domain for an IP address unique to the proxy server;
   request limit specifications of each restricted domain for a set of multiple unique IP addresses unique to the proxy server.

3. The system of claim 1, wherein the limit indicates a number of requests that can be submitted or forwarded to each of the list of restricted domains in the time frame.

4. The system of claim 1, wherein the client request comprises at least one, or a combination, of: Uniform Resource Locator (URL) of the target domain, relevant queries seeking data, authentication credentials.

5. The system of claim 4, wherein the authentication credentials can comprise at least one of or a combination of: usernames/IDs, passwords, personal identification numbers (PINs), serial numbers, or one-time passwords (OTPs).

6. The system of claim 1, wherein the proxy server receives the client request from the client device.

7. The system of claim 1, wherein the proxy server, upon receiving the client request executes an authentication and authorization process.

8. The system of claim 1, wherein the proxy server checks the target domain indicated in the client request to determine whether the target domain is in the list of restricted domains or in the list of unrestricted domains only when an authentication and authorization process is successful.

9. The system of claim 1, wherein the proxy regulator finds the proxy server information from the proxy database.

10. A non-transitory computer readable medium comprising instructions that, when executed by one or more processors in a network, direct the one or more processors to:
    install, by a proxy regulator, a configuration file on a proxy server:
    store, by the proxy regulator, configuration setting and metadata information about the proxy server in a proxy database;
    receive, by a gateway, a proxy server request about the proxy server from a client device;
    forward, by the gateway, the proxy server request to the proxy regulator,
    send, by the proxy regulator, proxy server information from the proxy database to the client device through the gateway;
    upon receiving a client request from the client device, check, by the proxy server, a target domain indicated in the client request to determine whether the target domain is in a list of restricted domains or in a list of unrestricted domains;
    wherein the check involves:
    if the target domain is in the list of unrestricted domains, sending the client request to the target domain;
    if the target domain is in the list of restricted domains, checking whether a request count for the target domain has reached a limit in a time frame; and:
      if the request count for the target domain is below the limit, the proxy server forwards the client request to the target domain;
      if the request count for the target domain is over the limit, the proxy server sends an error message to the client device;
    wherein the configuration file enables the proxy server to manage incoming requests and outgoing requests.

11. The non-transitory computer readable medium of claim 10, wherein the configuration file includes one, or a combination, of:
    the list of restricted domains and related sub-domains to which a rate-limiting functionality is applicable;
    the list of unrestricted domains and related sub-domains to which the rate-limiting functionality is not applicable;
    request limit specifications of each restricted domain for an internet protocol (IP) address unique to the proxy server;
    request limit specifications of each restricted domain for a set of multiple unique IP addresses unique to the proxy server.

12. The non-transitory computer readable medium of claim 10, wherein the limit indicates a number of requests that can be submitted or forwarded to each of the list of restricted domains in the time frame.

13. The non-transitory computer readable medium of claim 10, wherein the client request comprises at least one, or a combination, of: Uniform Resource Locator (URL) of the target domain, relevant queries seeking data, authentication credentials.

14. The non-transitory computer readable medium of claim 10, wherein the authentication credentials can comprise at least one of or a combination of: usernames/IDs, passwords, PINs, serial numbers, or OTPs.

15. The non-transitory computer readable medium of claim 10, wherein the client request is received from a client device.

16. The non-transitory computer readable medium of claim 10, wherein the proxy server receives the client request from the client device.

17. The non-transitory computer readable medium of claim 10, wherein the proxy server, upon receiving the client request executes an authentication and authorization process.

18. The non-transitory computer readable medium of claim 10, wherein the proxy server checks the target domain indicated in the client request to determine whether the target domain is in the list of restricted domains or in the list of unrestricted domains only when an authentication and authorization process is successful.

* * * * *